(12) United States Patent
Seorl et al.

(10) Patent No.: US 7,343,116 B2
(45) Date of Patent: Mar. 11, 2008

(54) GAS PURIFYING APPARATUS, IMAGE FORMING APPARATUS HAVING THE SAME, AND METHOD OF PURIFYING GAS OF THE IMAGE FORMING APPARATUS

(75) Inventors: Kwoang-joe Seorl, Suwon-si (KR); Hyou-jin Kim, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 198 days.

(21) Appl. No.: 11/182,760

(22) Filed: Jul. 18, 2005

(65) Prior Publication Data

US 2006/0037854 A1    Feb. 23, 2006

(30) Foreign Application Priority Data

Aug. 23, 2004  (KR) .................. 10-2004-0066550
Aug. 24, 2004  (KR) .................. 10-2004-0066843

(51) Int. Cl.
    *G03G 21/20*    (2006.01)
(52) U.S. Cl. ........................................ 399/93
(58) Field of Classification Search .............. 399/91, 399/92, 93
    See application file for complete search history.

(56) References Cited

U.S. PATENT DOCUMENTS 5,526,029 A    6/1996  Larson et al.
6,094,549 A *  7/2000  Hiraoka et al. ............. 399/93

FOREIGN PATENT DOCUMENTS

| JP | 4-78871 | 3/1992 |
|---|---|---|
| JP | 7-128955 | 5/1995 |
| KR | 10-2004-0017470 | 2/2004 |
| KR | 10-2004-0022944 | 3/2004 |
| KR | 10-2004-0026414 | 3/2004 |

* cited by examiner

*Primary Examiner*—Hoang Ngo
(74) *Attorney, Agent, or Firm*—Roylance, Abrams, Berdo & Goodman, L.L.P.

(57) ABSTRACT

A gas purifying apparatus oxidatively decomposes and discharges impurities such as flammable hydrocarbons ($C_mH_{2n}$) contained in gas generated from a toner by fixing an image. An image forming apparatus having a gas purifying apparatus, and a method of purifying gas of the image forming apparatus are also provided. The gas purifying apparatus comprises a fan unit for ventilating air, a heating unit for heating the air ventilated by the fan unit, a catalytic unit for facilitating oxidative decomposition of impurities contained in the air, and an ozone generation unit located upstream of the heating unit and the catalytic unit in the air flow direction. By providing the ozone generation unit for facilitating the oxidative decomposition reaction by the catalytic unit for impurities contained in gas generated by fixing an image, the gas purifying rate can be improved and by minimizing the reaction area of catalyst oxidizing impurities, and reducing the manufacturing costs.

31 Claims, 10 Drawing Sheets

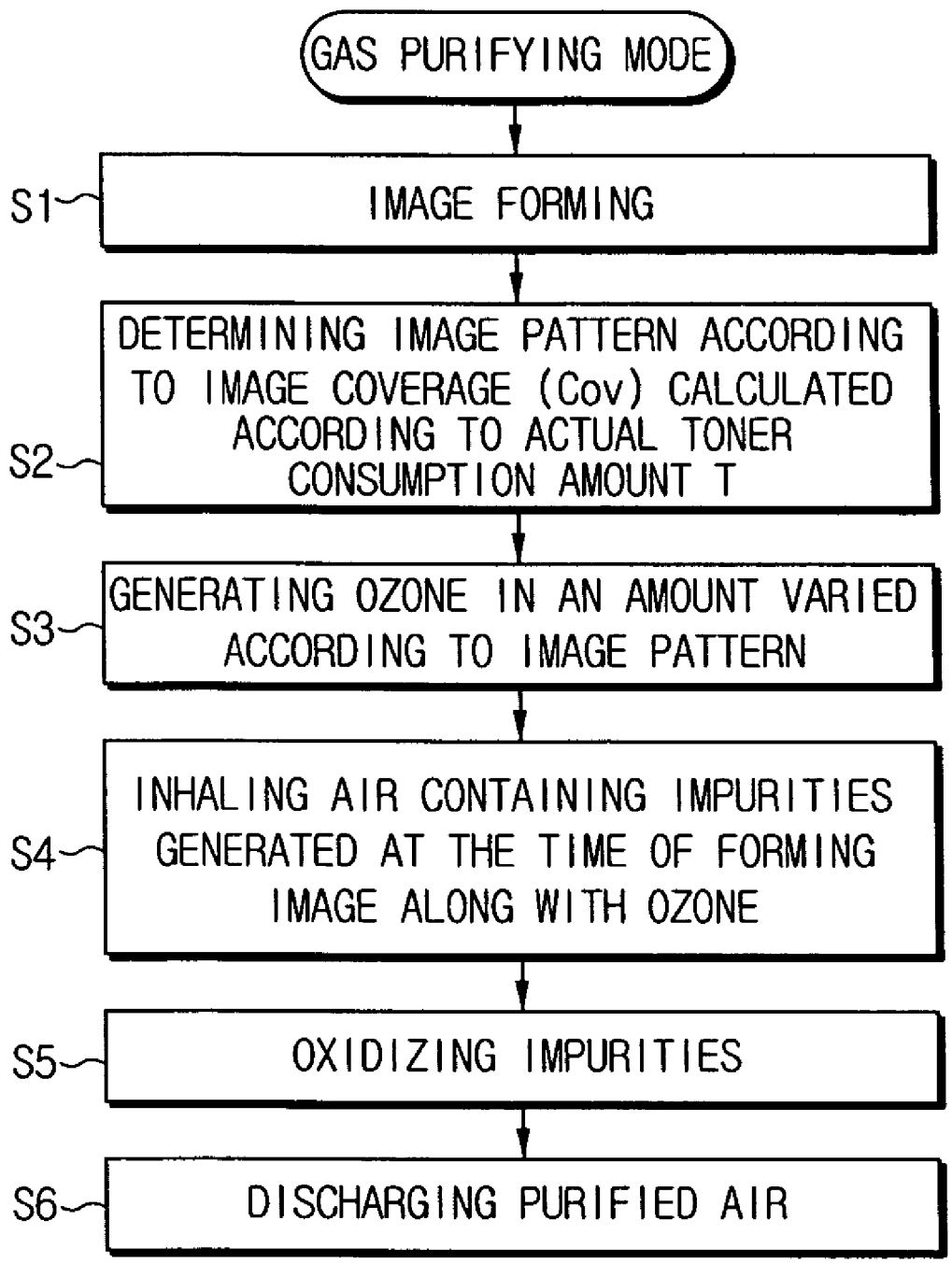

GAS PURIFYING APPARATUS, IMAGE FORMING APPARATUS HAVING THE SAME, AND METHOD OF PURIFYING GAS OF THE IMAGE FORMING APPARATUS

CROSS-REFERENCE TO RELATED APPLICATIONS

This application claims the benefit of Korean Patent Application Nos. 2004-66550 filed on Aug. 23, 2004; and 2004-66843 filed on Aug. 24, 2004, in the Korean Intellectual Property Office, the disclosures of which are incorporated herein by reference in their entirety.

BACKGROUND OF THE INVENTION

1. Field of the Invention

The present invention relates to an image forming apparatus, such as a wet electrophotographic printer. In particular, the present invention relates to a gas purifying apparatus for oxidatively decomposing and discharging impurities, such as flammable hydrocarbon ($C_mH_{2n}$) gases or vapors, contained in a gas generated at the time a transferred toner image is fixed onto a paper. The invention is also directed to an image forming apparatus having a gas purifying apparatus, and to a method of purifying gases produced during the fixing of the toner image to a substrate.

2. Description of the Related Art

In general, an image forming apparatus such as a wet electrophotographic printer, uses a liquid toner as a developer for printing. The liquid toner typically contains a hydrocarbon based carrier solution such as a mixture of $C_{10}H_{22}$, $C_{11}H_{24}$, $C_{12}H_{26}$, $C_{13}H_{28}$, etc., and a pigment. Most of the carrier solution contained in a liquid toner normally is drawn back into a developer storage during the process of developing a toner image onto a photoconductor through a developing roller and during the process of transferring the toner image formed on the photoconductor to a transfer belt. However, a part of the carrier solution remains in the toner image until the toner image is fixed on a paper or other substrate by fixation and heating rollers of a fixation unit at the time of image fixation or image transfer and fixation. The carrier solution remaining in the toner image is evaporated as flammable hydrocarbon gas such as methane ($CH_4$) by the heat of high temperature generated from the fixation and heating rollers at the time of fixing the toner image.

However, it is desirable to remove such flammable hydrocarbon gas generated by decomposition of the carrier solution before the gas is discharged out of the printer. The flammable hydrocarbon gases are volatile organic compound (VOC) so that gas not only pollutes the surrounding environment but also emits an unpleasant smell when released from the printer.

There are several deodorizing methods of removing such flammable hydrocarbons as known in the art, including a filtration method for physically filtering and removing gaseous components, a direct combustion method for oxidatively combusting gaseous components using heat having a temperature exceeding the ignition temperature (600-800° C.), and a catalytic oxidation method for heating gaseous compounds to a relatively low temperature (150-400° C.) using a catalyst, thereby oxidatively decomposing the gaseous components into water and carbon dioxide.

Referring to FIG. 1, this figure illustrates a gas purifying apparatus 10 which receives high temperature air containing a hydrocarbon gas generated within a printer 1 during a printing operation such as image-fixation and then discharges the air after removing the hydrocarbon gas from the air.

The gas purifying apparatus 10 comprises a ventilation fan 13 for drawing in air from the vicinity of a fixation device 11 of the printer 1 and discharging the air out of the printer 1. A filtering device 12 is interposed between the ventilation fan 13 and the outside of the printer to filter impurities, such as flammable hydrocarbons, contained in the air. The filtering device 12 comprises a dust filter 12a for trapping dust, and active carbon 12b for adsorbing and removing hydrocarbon gases generated by the evaporation of carrier solution at the time of image fixation or image transfer and fixation. Thus, the air drawn in from the inside of the printer by the ventilation fan 13 is filtered while passing through the filtering unit 12 so that the hydrocarbon gas contained in the air is removed, and then discharged out of the printer 1.

However, the gas purifying apparatus 10 configured as described above has a disadvantage in that it is necessary to frequently replace the filtering device 12 with new one. The filtering device loses its gas adsorption capability during extended use when the active carbon 12b adsorbs too much hydrocarbon gas. In addition, because the gas purifying apparatus 10 directly discharges hot air out of the printer after the hot air has passed the filtering unit 12, it can cause a safety problem that a user may get a burn.

In order to prevent such problems, there has been proposed a gas purifying apparatus 10' as shown in FIG. 2, which draws in hot air containing hydrocarbon gases generated from the interior of a printer and then discharges the air after removing the hydrocarbon gas using a direct combustion method.

The gas purifying apparatus 10' comprises an exhaust line L forming an air flow passage from a fixation device 11' to the exterior of a printer 1', a ventilation fan 40 located at the middle of the exhaust line L to draw in and outwardly discharge air existing in the printer 1, a combustion unit 20 for heating and combusting the air discharged from the ventilation fan 40, a heat exchange unit 30 for cooling again the hot air, and a dust filter 33 for removing dust contained in the air.

The combustion unit 20 includes a heater 21 capable of emitting heat in the range of 1,000 to 1,300° C. The heater 21 allows the hydrocarbon gas contained in the air moving along the exhaust line L to be pyrolyzed into carbon dioxide and vapor and discharged.

The heat exchange unit 30 for cooling the air heated by the heater 21 comprises a coil tube 31 formed in a helical shape to increase the residence time of the air, and a cooling fan 32 for blowing air to the external wall of the coil tube 31 so as to cool the coil tube 31 through heat exchange between the interior and exterior atmospheres of the coil tube 31.

When the gas purifying apparatus is operated, the hydrocarbon gas contained in the air drawn into the combustion unit 20 by the ventilation fan 40 is pyrolyzed by the heater, cooled by the coil tube 31 and the cooling fan 32 of the heat exchange unit 30, and then discharged out of the printer through the dust filter 33.

Such a conventional gas purifying apparatus 10' can provide an improvement over the troublesome and frequent replacement of the entire filtering unit 12 and the safety problem caused by discharging hot air as in the gas purifying apparatus 10 shown in FIG. 1. The apparatus of FIG. 2 discharges the hydrocarbon gas after the hydrocarbon gas has been pyrolyzed by the heater 21 and cooled.

However, the gas purifying apparatus 10' has a problem in that the manufacturing costs are high and the apparatus is difficult to manufacture, because the cooling fan 32 and the coil tube 31 are employed to cool hot air in addition to the ventilation fan 40. The construction of the apparatus of FIG. 2 is very complicated.

Furthermore, the purifying apparatus 10' also has a problem in that the manufacturing and maintenance costs are high because it is necessary to employ an expensive heater 21 having a high heating temperature in the range of about 1000-1300° C. so as to pyrolyze hydrocarbon gas into carbon dioxide and vapor.

In order to solve these problems, there has been proposed a gas purifying apparatus 10" as shown in FIG. 3, in which a platinum catalyst 22 for promoting the oxidative decomposition of hydrocarbon gas is installed around the heater 21 of the combustion unit 20'. The catalyst lowers the temperature required for decomposition of the hydrocarbon gases and lowers the temperature emitted by the heater 21.

However, the gas purifying apparatus 10" still has problems of high manufacturing costs and complicated construction due to the addition of the cooling fan 32 and the coil tube 31 of the heat exchange unit 30. This apparatus does have an advantage in that it can oxidatively decompose hydrocarbon gases while maintaining the heating temperature of the heater 21 in the range of about 250-300° C.

Moreover, the gas purifying apparatus 10" also has the disadvantage of using an expensive platinum catalyst 22 for promoting the oxidative decomposition of hydrocarbon. A large quantity of platinum is required for the catalyst to provide a reaction area over a predetermined range around the heater 21 so as to maintain the heating temperature of the heater 21 in the range of about 250-300° C. The manufacturing costs of the catalyst and the gas purifying apparatus are high.

SUMMARY OF THE INVENTION

Accordingly, the present invention solves the above-mentioned problems. One aspect of the present invention is to provide a gas purifying apparatus having an ozone generation unit which can minimize the volume of catalyst otherwise required for oxidatively decomposing impurities such as flammable hydrocarbons contained in gases generated at the time of fixing an image. The invention is also directed to an apparatus to improve a gas purifying rate, an image forming apparatus having such a gas purifying apparatus, and a method of purifying the gas.

Another aspect of the present invention is to provide a gas purifying apparatus having an ozone generation unit which can control the amount of ozone generated in such a manner that the amount can be varied according to the amount of impurities such as flammable hydrocarbon gas contained in the gas generated by fixing an image. Controlling the amount of ozone produced enables control of the purifying rate of the impurities contained in the gas so the rate of purification can be increased and decreased as needed.

In order to achieve the above-mentioned aspects, there is provided a gas purifying apparatus for an image forming apparatus, comprising: a fan unit for ventilating air; a heating unit for heating the air ventilated by the fan unit; a catalytic unit for facilitating an oxidative decomposition of impurities contained in the air; and an ozone generation unit for generating ozone, the ozone generation unit being located upstream of the heating unit and the catalytic unit in the air flowing direction.

According to a preferred embodiment, the ozone generation unit comprises an ozone generator which generates ozone by a process selected from the group consisting of a plasma process, a corona discharge process, an electrolysis process, a photochemical process and a radiation process.

The heating unit may comprise a heater which electrically generates heat.

Preferably, the catalytic unit comprises a carrier containing gamma alumina and/or diatomaceous earth, and a catalyst coated on the outer surface of the carrier and selected from the group consisting of Pd, Pt, $Co_3O_4$, PdO, $Cr_2O_3$, $Mn_2O_3$, CuO, $SeO_2$, $FeO_2$, $Fe_2O_3$, $V_2O_5$, NiO, Ag, $MoO_3$ and $TiO_2$. The catalyst is present in an amount sufficient to decompose the impurities in the gas catalytically. The carrier preferably has a plurality of openings formed in the air flow direction and shaped to have a cross-sectional shape selected from a grid shape, a corrugated cardboard shape and a honeycomb shape, so that the area to be contacted with hydrocarbon gas can be increased. The openings in the catalytic unit have openings to provide a surface area that is sufficient to decompose the impurities and particularly the hydrocarbon by-products in the exhaust gas produced during the heating and fixing process of the toner image.

The catalytic unit is located at the downstream end of the heating unit away from the heating unit. Alternatively, the catalytic unit may be formed to be in contact with the heating unit.

In addition, the inventive gas purifying apparatus can include a control device to control the amount of ozone generated by the ozone generation unit in such a manner that the amount of ozone can be varied according to an image pattern formed by an image forming apparatus. In this event, the gas purifying apparatus further comprises an image pattern determination unit for determining an image pattern to be formed by the image forming apparatus, and an engine controller operatively connected to the image forming apparatus for controlling the amount of ozone generated by the ozone generation unit in such a manner that the ozone generation amount is varied according to the image pattern determined by the image pattern determination unit. The image pattern determination unit calculates an image coverage (Cov) according to an actual toner consumption amount (T) consumed at the time when the image forming apparatus forms an image, and determines one image pattern among a plurality of preset image patterns according to the calculated image coverage (Cov). The engine controller controls the ozone generation unit, in such a manner to generate ozone in an amount corresponding to one of a plurality of preset values corresponding to an amount of ozone according to the determined image pattern. At this time, the plural preset image patterns preferably include a text pattern, a graphic pattern and a photo pattern, and the plural preset values of a corresponding amount of ozone generated preferably include about 10 ppm, about 20 ppm, and about 60 ppm, respectively.

Alternatively, the inventive gas purifying apparatus can control the amount of ozone generated by the ozone generation unit in such a manner that the amount is varied according to the amount of impurities contained in the air. In this case, the gas purifying apparatus further comprises a gas detection sensor for detecting the amount of impurities contained in the air, and an engine controller for variably controlling the amount of ozone generated by the ozone generation unit according to the amount of impurities detected by the gas detection sensor. The gas detection sensor may comprise a hydrocarbon detection sensor operatively connected to the engine controller to control the ozone generation unit. The engine controller then controls the ozone generation unit in such a manner that ozone is generated in an amount corresponding to one of a plurality of preset values of the amount of ozone according to the amount of impurities detected by the hydrocarbon detection sensor. The plural preset values of the amount of ozone are preferably about 10 ppm, about 20 ppm, and about 60 ppm.

According to another aspect of the present invention, there is provided an image forming apparatus comprising: a fixation unit for fixing a transferred toner image on a paper with heat and pressure; and a gas purifying unit for purifying and discharging impurities contained in a gas generated at the time of fixing the toner image, wherein the gas purifying unit comprises: an exhaust duct forming an air discharge passage from an interior to an exterior of the image forming apparatus, a ventilation fan unit for ventilating and discharging air through the exhaust duct, a heating unit for heating air discharged through the exhaust duct, a catalytic unit for facilitating an oxidative decomposition of impurities contained in the air, and an ozone generation unit for generating ozone, the ozone generation unit being located upstream of the heating unit and the catalytic unit in the direction of flow of the air.

In a preferred embodiment, the ozone generation unit comprises an ozone generator which generates ozone according to any one of a plasma process, corona discharge process, an electrolysis process, a photochemical process and a radiation process.

The heating unit may comprise a heater which electrically generates heat.

The catalytic unit may comprise a carrier containing one component selected from the group consisting of gamma alumina and diatomaceous earth, and a catalyst coated on the outer surface of the carrier and formed from at least one component selected from a group consisting of Pd, Pt, $Co_3O_4$, PdO, $Cr_2O_3$, $Mn_2O_3$, CuO, $SeO_2$, $FeO_2$, $Fe_2O_3$, $V_2O_5$, NiO, Ag, $MoO_3$ and $TiO_2$. The carrier preferably has plural openings formed in the air flow direction and shaped to have a cross-sectional shape selected from a grid shape, a corrugated cardboard shape and a honeycomb shape, so that the area to be contacted with hydrocarbon gas can be increased.

In addition, the inventive gas purifying apparatus can control an amount of ozone generated by the ozone generation unit in such a manner that the amount can be varied according to an image pattern formed by an image forming apparatus. In this event, the gas purifying apparatus further comprises an image pattern determination unit for determining an image pattern to be formed by the image forming apparatus, and an engine controller operatively connected to the image pattern determination unit for controlling the amount of ozone generated by the ozone generation unit in such a manner that the amount of ozone is varied according to the image pattern determined by the image pattern determination unit. The image pattern determination unit calculates an image coverage (Cov) according to an actual toner consumption amount (T) consumed at the time when the image forming apparatus forms an image, and determines one image pattern among a plurality of preset image patterns according to the calculated image coverage (Cov), and the engine controller controls the ozone generation unit, in such a manner that the ozone generation unit generates ozone in an amount corresponding to one of a plurality of preset values of ozone generation amount according to the determined image pattern. At this time, the plural preset image patterns preferably include a text pattern, a graphic pattern and a photo pattern, and the plural preset values of ozone generation amount preferably include about 10 ppm, about 20 ppm, and about 60 ppm.

Alternatively, the gas purifying apparatus of the invention can control the amount of ozone generated by the ozone generation unit in such a manner that the amount is varied according to the amount of impurities contained in the air. In this case, the gas purifying apparatus further comprises a gas detection sensor for detecting the amount of impurities contained in the air, and an engine controller connected to the gas detection sensor for variably controlling the ozone generation amount of the ozone generation unit according to the amount of impurities detected by the gas detection sensor. The gas detection sensor may comprise a hydrocarbon detection sensor, and the engine controller controls the ozone generation unit, in such a manner that the ozone generation unit generates ozone in an amount corresponding to one of a plurality of preset values of ozone generation amount according to the amount of impurities detected by the hydrocarbon detection sensor. The plural preset values of ozone generation amount preferably include about 10 ppm, about 20 ppm, and about 60 ppm.

According to another aspect of the present invention, there is provided a method of purifying gas from an image forming apparatus comprising steps of: forming an image; generating ozone; and oxidatively decomposing impurities contained in gas generated at the time of forming the image with the ozone.

In a preferred embodiment, the ozone generating step comprises variably generating ozone according to a pattern of the image formed by the image forming step. The step of variably generating ozone according to the image pattern comprises: calculating an image coverage (Cov) according to an actual toner consumption amount (T) consumed at the time of forming the image and determining an image pattern among plural preset image patterns according to the calculated image coverage (Cov), and generating ozone in an amount corresponding to one of a plurality of preset values of an amount of ozone according to the predetermined image pattern. At this time, the plural preset image patterns preferably include a text pattern, a graphic pattern and a photo pattern, and the plural preset values of ozone generation amount preferably include about 10 ppm, about 20 ppm, and about 60 ppm.

Alternatively, the ozone generating step can be performed by generating an ozone in an amount varied according to the amount of impurities contained in gas generated at the time of fixing an image. The step of generating the ozone in the amount varied according to the amount of impurities comprises: detecting the amount of impurities; and generating ozone in an amount corresponding to one of a plurality of preset values of ozone generation amount according to the amount of the detected impurities. At this time, the plural preset values of ozone generation amount preferably include about 10 ppm, about 20 ppm, and about 60 ppm.

These and other aspects of the invention will become apparatus from the following detailed description of the invention, which when taken in conjunction with the annexed drawings, disclose various embodiments of the invention.

BRIEF DESCRIPTION OF THE DRAWINGS

The above aspects and features of the present invention will be more apparent from the description for certain embodiments of the present invention taken with reference to the accompanying drawings, in which:

FIG. 10 is a flow chart exemplifying a process of a gas purifying method by the gas purifying device of the wet electrophotographic color printer shown in FIG. 4;

DETAILED DESCRIPTION OF THE PREFERRED EMBODIMENTS

Hereinbelow, the embodiments of the present invention will be described in more detail with reference to the accompanying drawings.

The matters defined in the description such as a detailed arrangement and elements are provided to assist in a comprehensive understanding of the invention but are not intended to limit the scope of the invention. Thus, it is apparent that the present invention can be carried out without those defined matters. Also, well-known functions or arrangements are not described in detail since they could unnecessarily obscure the invention.

EXAMPLE 1

Figure 1:
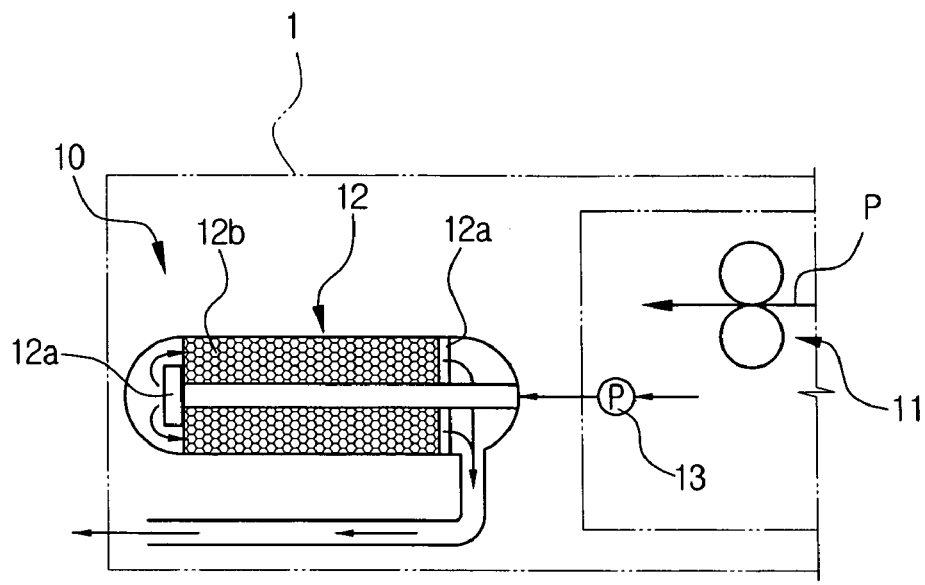
FIG. 1 is a schematic front elevational view of a conventional gas purifying apparatus for a wet electrophotographic printer.
Figure 2:
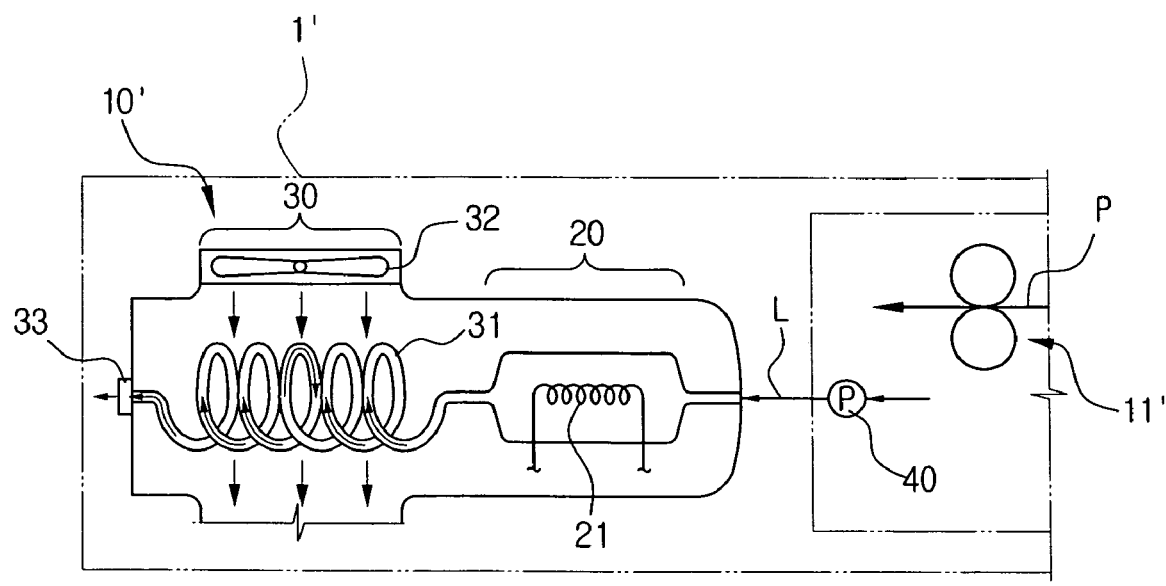
FIG. 2 is a schematic front elevational view of another conventional gas purifying apparatus for a wet electrophotographic printer.
Figure 3:
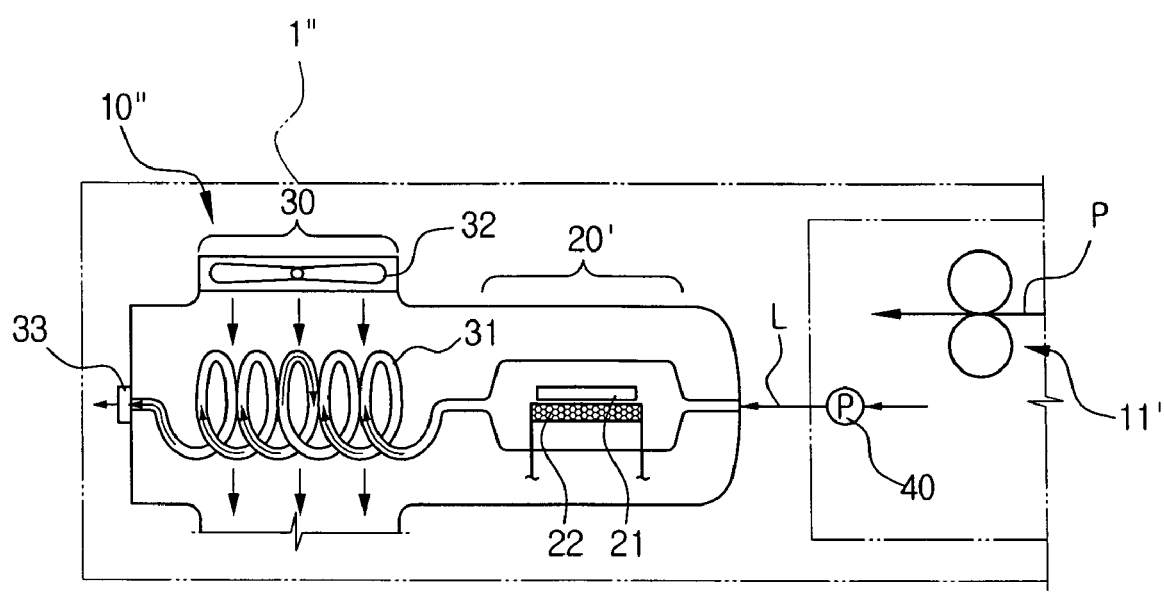
FIG. 3 is a schematic front elevational view of still another conventional gas purifying apparatus for a wet electrophotographic printer.
Figure 4:
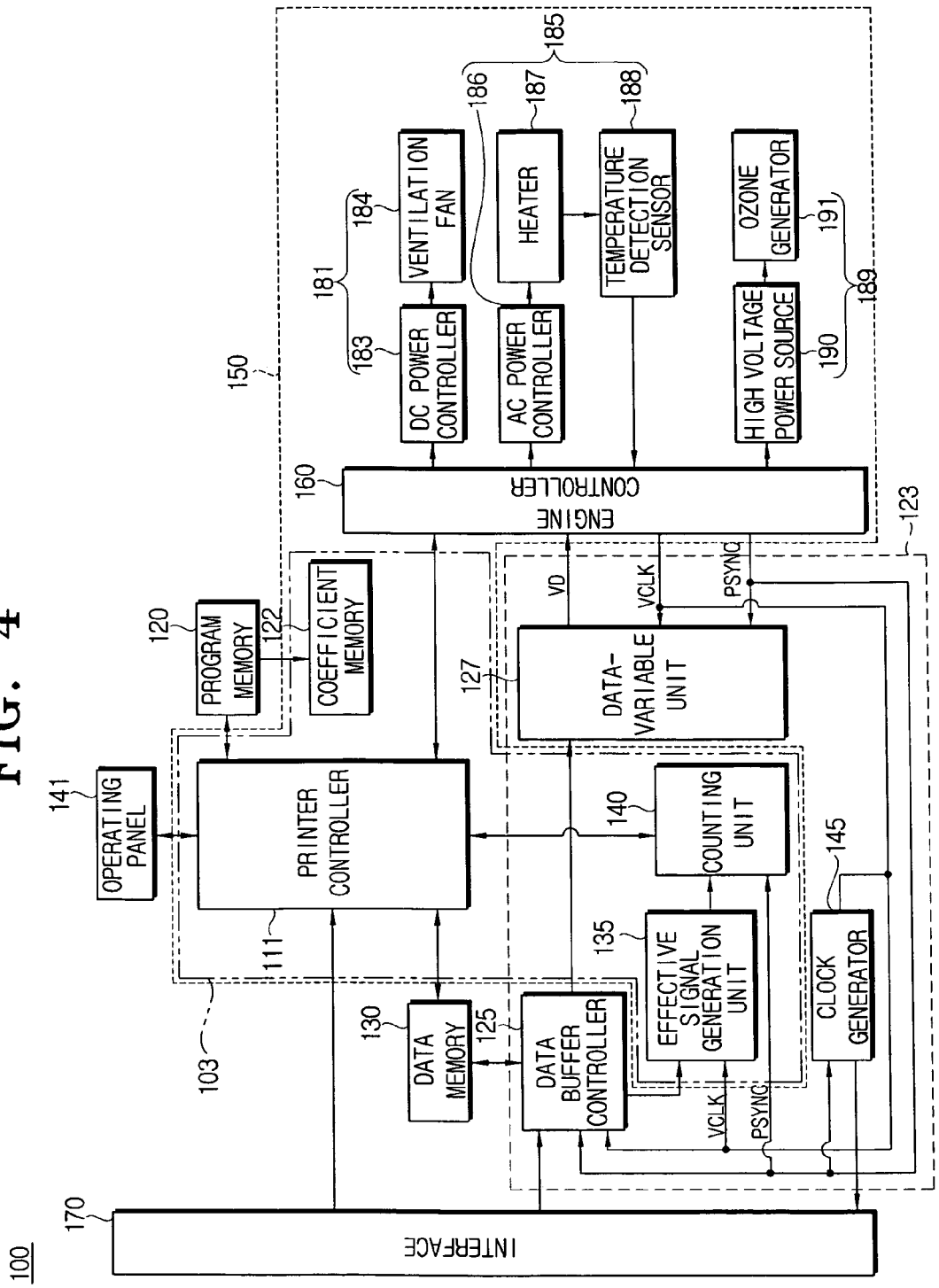
FIG. 4 is a schematic block diagram of a wet electrophotographic color printer including a gas purifying apparatus according to a first embodiment of the present invention.
Figure 5:
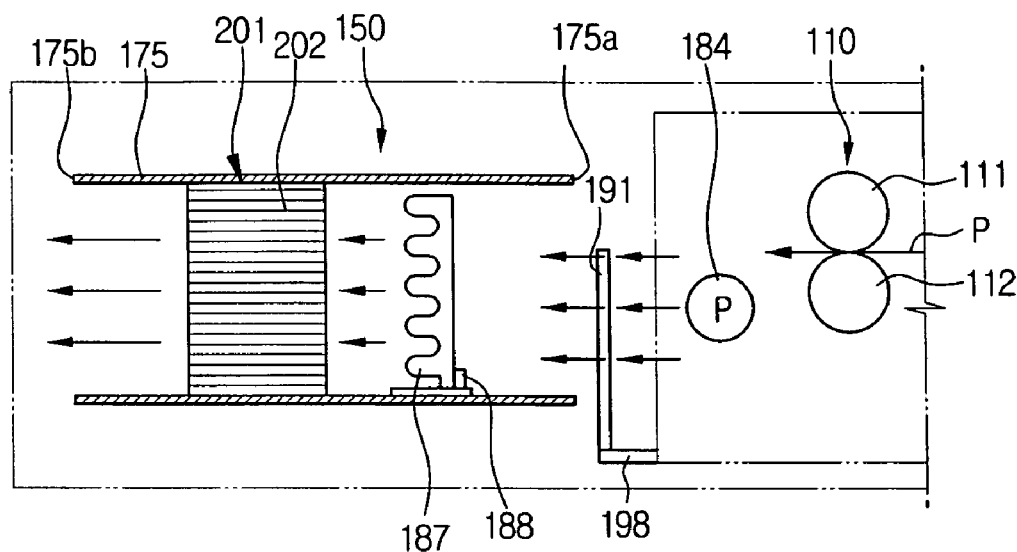
FIG. 5 is a schematic front elevational view of the gas purifying apparatus of the wet electrophotographic color printer shown in FIG. 4.

FIGS. 4 and 5 show a gas purifying apparatus 150 according to a first preferred embodiment of the present invention.

An image forming apparatus, to which the gas purifying apparatus 150 may be applied, is a wet electrophotographic color printer 100 which internally processes data transmitted from a computer (not shown) or the like through an interface 170 and executes a print mode.

The wet electrophotographic color printer 100 comprises an interface 170 forming a connection part for interchanging data with a computer or the like, an operating panel 141 for inputting a user's command or selection, a program memory 120 for storing various control programs required for driving the printer 100, a data memory 130 for storing various data generated as the control programs are implemented and print data transmitted through the interface 170, a printer controller 111 for implementing the control programs to control respective parts of the printer, a engine controller 160 controlled by the printer controller 111 to control the printer mechanism, a data controller 123 for outputting the print data transmitted through the interface 170 to the engine controller 160, and a gas purifying apparatus 150 for oxidatively decomposing and outwardly discharging impurities, such as flammable hydrocarbons, contained in gas produced when a toner image containing a carrier solution is fixed on a paper by a fixation unit 110 (see FIG. 5).

The electrophotographic printer of the invention forms an image from a toner and transfers the image to a substrate such as paper. A heated roller as discussed hereinafter in greater detail applies heat and pressure to fix the image onto the substrate. The toner is typically a liquid or "wet" toner as known in the art. The toners used to form the image often release organic compounds in the form of vapors or gases by the heating and fixing process. Many of the organic compounds that are produced and released by the heating and fixing are flammable and noxious. Some of the components released are volatile organic compounds, commonly referred to as VOCs. Hydrocarbons, and particularly lower alkanes such as methane, can be produced during the fixing step. The invention is directed to an air purification assembly that is able to decompose oxidatively and catalytically the organic components released from the toner.

The program memory 120 consists of a flash memory which is a non-volatile memory writable/erasable for each sector with software, and the data memory 130 consists of a random access memory (RAM) which is a writable/erasable volatile memory.

The data controller 123 comprises a data buffer controller 125, a clock generator 145, and a data-variable unit 127.

The engine controller 160 applies a video clock (VCLK) and a print synchronizing signal(PSYNC) to the data-variable unit 127 and forms a part of a gas purifying unit 150, which will be described later in detail.

The data buffer controller 125 outputs the print data transmitted from a computer or the like through the interface 170 to the data-variable unit 127 simultaneously with storing the print data into the data memory 130 according to the video clock (VCLK) and print synchronizing signal (PSYNC) applied from the engine controller 160.

The data-variable unit 127 receives the print data outputted from the data buffer controller 125 and outputs to the engine controller 160 bit by bit as video data (VD) according to the video clock VCLK and print synchronizing signal (PSYNC).

The clock generator 145 receives the video clock VCLK applied from the engine controller 160 and generates a clock for demanding print data to the computer or the like.

The gas purifying apparatus 150 comprises an image pattern determination unit 103 as shown in FIG. 4, an engine controller 160, a ventilation fan unit 181, an exhaust duct 175 as shown in FIG. 5, an ozone generation unit 189, a heating unit 185, and a catalytic unit 201 as shown in FIG. 4.

The image pattern determination unit 103 consists of an effective signal generation unit 135, a counting unit 140, a coefficient memory 122, and a printer controller 111.

Figure 6:
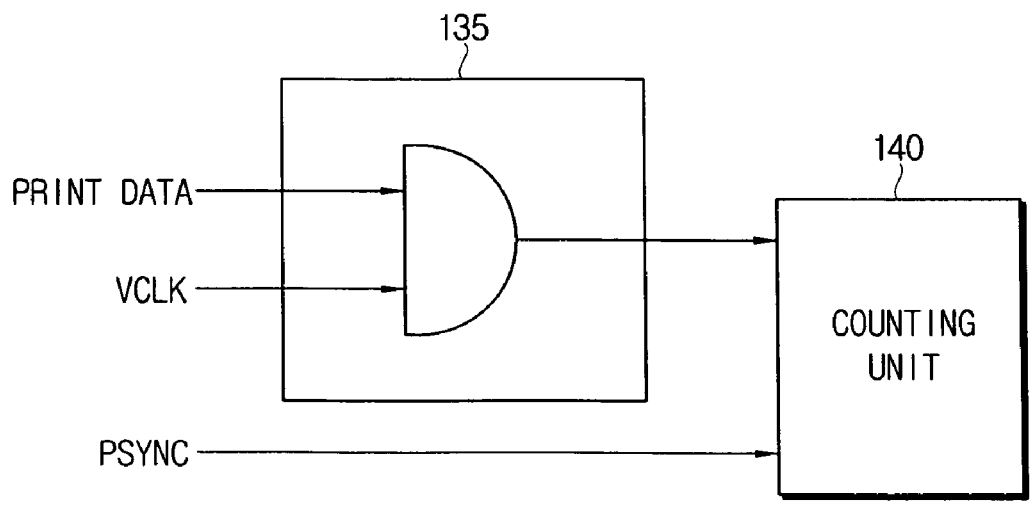
FIG. 6 is a block diagram of an effective signal generation unit of an image pattern determination unit of the wet electrophotographic color printer shown in FIG. 4.
Figure 7:
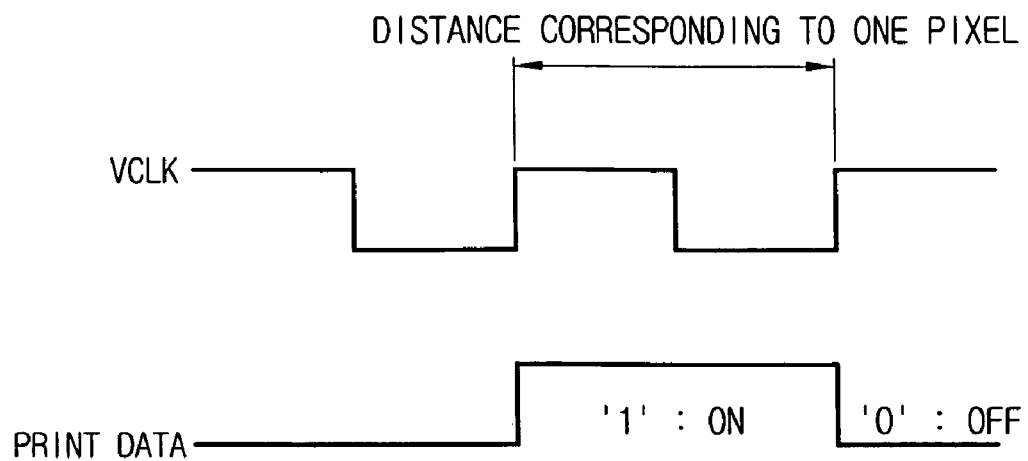
FIG. 7 is a waveform diagram of a print data and a video data synchronized signal (VCLK) inputted into the effective signal generation unit shown in FIG. 6.

As shown in FIGS. 6 and 7, the effective signal generation unit 135 comprises an AND gate, wherein when a pixel of print data is inputted from the data buffer controller 125, the print data is synchronized with a video clock signal VCLK of the engine controller 160 and thus a binary image data having a count effective signal maintaining a value of '0' or '1' within one video clock is generated.

The counting unit 140 as shown in FIG. 6 counts the number of count effective signals having a value of '0' or '1' in the binary image data outputted from the effective signal generation unit 135, i.e., the number of pixels and outputs a count signal to the printer controller 111 as shown in FIG. 7.

The coefficient memory 122 of FIG. 4 is provided in the program memory 120 and stores a preset coefficient K of the toner consumption amount per unit cell. The coefficient K of the toner consumption amount per unit cell is determined through repeated tests, each being performed in such a manner that the actual toner consumption amount actually consumed at the time of printing a form of an image under a condition of normal temperature and normal humidity using a printer set in a manufacture default value is measured and each test and the amount is divided by the number of entire counted pixels. The optimum value among the various values obtained by printing various forms of images through the repeated tests is determined as the coefficient K.

The printer controller 111 determines an image pattern of a toner image according to an image coverage (Cov) (%) calculated depending on the actual toner consumption amount T consumed each time when a toner image of one page is formed, and outputs a control signal for controlling an ozone generation amount to the engine controller 160 which controls the ozone generation unit 189, so that the ozone generation amount is varied depending on the determined image pattern.

More specifically, using the coefficient K of the toner consumption amount per unit pixel stored in the coefficient memory 122, and the numbers of pixels Ypixel, Mpixel, Cpixel and Kpixel of respective four colors, i.e., yellow, magenta, cyan and black of a print data counted by the counting unit 140 for one page, the printer controller 111 first calculates the actual toner consumption amount T for four colors according to Equation 1 as follows:

$$T = K(Ypixel + Mpixel + Cpixel + Kpixel) \quad (1)$$

Wherein, K is the coefficient of toner consumption amount per unit pixel, Ypixel is the number of pixels of yellow in a counted print data, Mpixel is the number of pixels of magenta in the print data, Cpixel is the number of pixels of cyan in the print data, and Kpixel is the number of pixels of black in the print data.

After calculating the actual toner consumption amount T, the printer controller 111 calculates the image coverage (Cov) (%) of a toner image of one page on the basis of the actual toner consumption amount T according to Equation 2 below, selects one value from plural preset image patterns for one page, e.g., three image patterns exemplified in Table 1 below on the basis of the calculated image coverage (Cov) (%), and then outputs a control signal to the engine controller 160 so that the ozone generation unit 189 generates ozone (O$_3$) in an amount corresponding to one of plural preset values of the amount of ozone to be generated, e.g., three values of ozone generation amount exemplified in Table 1 below according to the determined image pattern.

$$Cov~(\%) = T/T1 \times 100 \quad (2)$$

Wherein, T is an actual toner consumption amount for four colors on one page, and T1 is a toner consumption amount of one color capable of printing one page for the total number of pixels Npixel in the one page (i.e., K×Npixel).

TABLE 1

| Image coverage (Cov) | Image pattern | Ozone generation amount |
| --- | --- | --- |
| 0-20% | Text pattern | About 10 ppm |
| 20-60% | Graphic pattern | About 20 ppm |
| Exceeding 60% | Photo pattern | About 60 ppm |

Referring to FIG. 4, the engine controller 160 outputs a pulse width modulation (PWM) signal to a high voltage power source 190 corresponding to an ozone generation control signal transmitted from the printer controller 111, so that the ozone generation amount of the ozone generation unit 189 is controlled to a value corresponding to a determined image pattern.

The ventilation fan unit 181 comprises a ventilation fan 184 installed between the fixation and heating rollers 111, 112 of the fixation unit 110 and the exhaust duct 175 as shown in FIG. 5, and a DC power controller 183 as shown in FIG. 4 for controlling DC power applied to the drive motor (not shown) of the ventilation fan 184 according to a control signal of the engine controller 160.

The ventilation fan 184 draws in hot air containing impurities, such as flammable hydrocarbon gases generated from hydrocarbon based carrier solution included in a toner image when the toner image is fixed on a paper P by the high temperature of the fixation and heating rollers 111, 112 of the fixation unit 110 within the printer. The ventilation fan 184 then discharges the air outside of the printer through the exhaust duct 175.

The ventilation fan 184 may be configured in an appropriate type of fan capable of ventilating and discharging air through the exhaust duct 175. Examples of suitable fans include a transverse flow type fan or a propeller fan, which can be selected according to the construction and type of the exhaust duct 175.

In the exemplified embodiment, the ventilation fan 184 is formed separately from the exhaust duct 175. However, it will be understood that the ventilation fan 184 is connected with the exhaust duct 175 by a connection means not shown in the drawings so that the former can discharge air through the latter.

The exhaust duct 175 is formed from a tube having a cross-section of a square and forms an air discharge passage between the fixation unit 110 within the printer and the outside of the printer.

The ozone generation unit 189 comprises an ozone generator 191 and a high voltage power source 190. As shown in FIG. 5, the ozone generator 191 is mounted between the ventilation fan 184 and an inlet 175a of the exhaust duct 175 by means of an anchoring bracket 189 secured to a frame (not shown) of the printer body. The ozone generator 191 may be directly installed at the inlet 175a of the exhaust duct 175 instead of being installed between the ventilation fan 184 and the inlet 175a of the exhaust duct 175 by means of the anchoring bracket 198.

The ozone generator 191 may be an ozone generator which electrically forms plasma to generate ozone (O$_3$) from air ventilated by the ventilation fan 184 so as to minimize the corrosion of the heater 187 of the heating unit 185 as described later.

Figure 8:
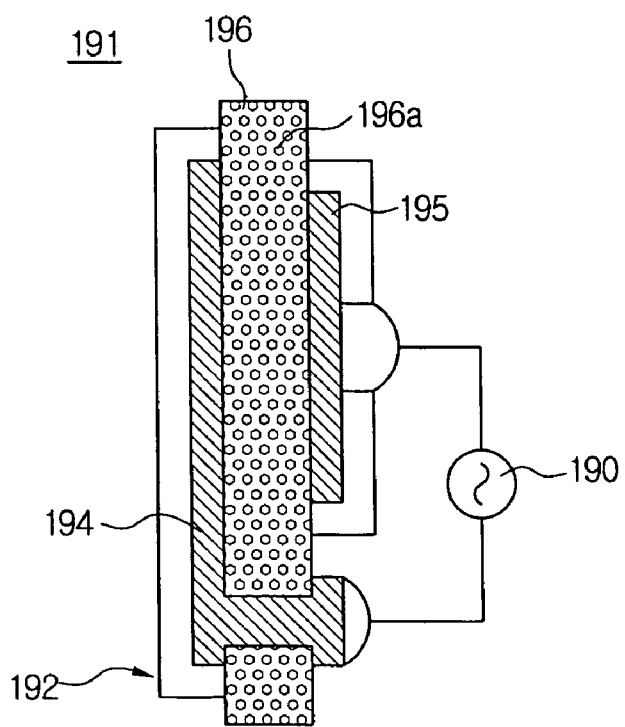
FIG. 8 is a schematic cross-sectional view of an ozone generation unit of the gas purifying apparatus shown in FIG. 5.

As shown in FIG. 8, the ozone generator 191 comprises a plasma electrode 192. The plasma electrode 192 comprises an electric-discharge electrode 194, an induction electrode 195, wherein the electrodes 194, 195 are arranged to vertically or horizontally face each other, and a ceramic dielectric substrate 196 interposed between the electric-discharge electrode 194 and the induction electrode 195. The dielectric substrate 196 is formed with numerous pores 196$a$, through which air passes. The electric-discharge electrode 194 and the induction electrode 195 are connected to the high voltage power source 190.

The high voltage power source 190 comprises a PWM inverter and applies to the electric-discharge electrode 194 and the induction electrode 195 a high voltage exceeding several KV corresponding to the ozone generation amount based on the image pattern determined by the printer controller 111 according to the PWM signal of the engine controller 160. When the high voltage is applied to the electric-discharge electrode 194 and the induction electrode 195, the dielectric substrate 196 forms oxygen plasma from air existing in the pores 196$a$ of the dielectric substrate 196, and ionized oxygen atoms (O), which is produced by the oxygen plasma formed in this manner, are joined with oxygen molecules ($O_2$), thereby forming ozone ($O_3$).

Although it has been exemplified herein that the ozone generator 191 comprises only a plasma electrode 192, it is possible to configure the ozone generator 191 in a form to include a separate ventilation fan (not shown) for ventilating air toward the plasma electrode 192, and a housing for receiving the plasma electrode 192 and the ventilation fan, wherein the housing is provided with an outlet for discharging the ozone ($O_3$) generated from the plasma electrode 192 toward the inlet 175$a$ of the exhaust duct 175.

In addition, although it has been described herein that the ozone generator 191 consists of an ozone generator forming plasma to generate ozone ($O_3$) from the supplied air to minimize the corrosion of the heater 187 of the heating unit 185, the present invention is not limited to this embodiment. In other embodiments, other types of ozone generators can be used, for example, an ozone generator which generates ozone ($O_3$) through a corona discharge process, an electrolysis process, a photochemical process or a radiation process.

Referring to FIGS. 4 and 5, the heating unit 185 comprises an electrically heated heater 187, a temperature detection sensor 188 for detecting the temperature of the heater 187 and for sending a temperature detection signal to the engine controller 160, and an AC power controller 186 for controlling AC power to the heater 187 according to the control signal from the engine controller 160.

The heater 187 is disposed in the exhaust duct 175 in the vicinity of the inlet 175$a$ of the exhaust duct 175 as shown in FIG. 5 and promotes the oxidative decomposition of impurities, such as flammable hydrocarbon gas, contained in hot air discharged through the exhaust duct 175 by heating the air discharged by the ventilation fan 184 along with the ozone ($O_3$) generated from the ozone generator 191, so that the impurities contained in the air can be removed. At this time, a very small amount of impurities can be pyrolyzed by the heat of the heater 187.

The heater 187 may be a sheath heater formed in a zigzag shape so that the area to be contacted with the hydrocarbon gas can be increased to enhance heat transfer and to have a heating temperature in the range of about 150-400° C. Although the heater 187 is illustrated as a sheath heater in a zigzag shape for better and easier understanding, the heater can be implemented in a different form which can efficiently transfer heat or which is easy to configure, such as a coil heater or a fin heater having heat exchange fins.

The heat detection sensor 187 comprises a thermistor attached to a side of the heater 187 to detect the temperature of the heater 187.

The AC power controller 186 applies AC voltage to the heater 187 according to a control signal from the engine controller 160. The engine controller 160 controls the AC power controller 186 to maintain the heater 187 at a temperature in the range of 200-250° C. according to a temperature detection signal from the temperature detection sensor 187.

Figure 9A:
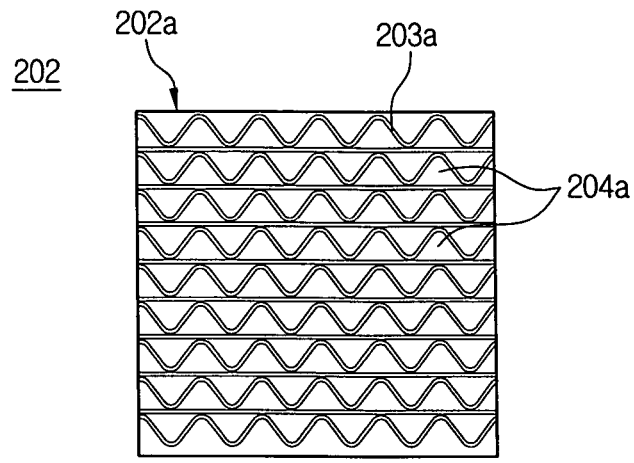
FIGS. 9A, 9B and 9C are front elevational views of oxidative catalyst members each being employed in the gas purifying apparatus shown in FIG. 5.
Figure 9B:
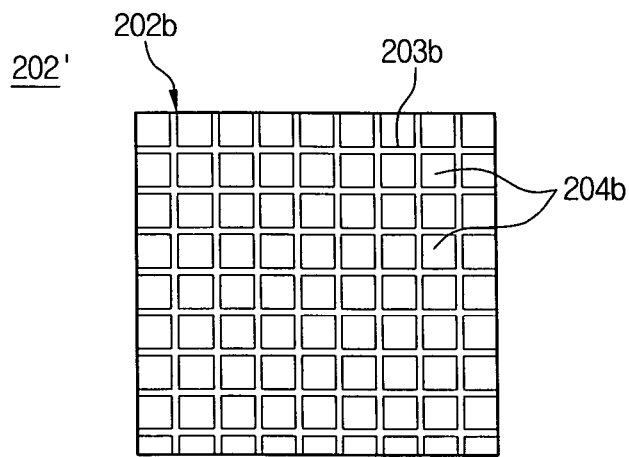
Figure 9C:
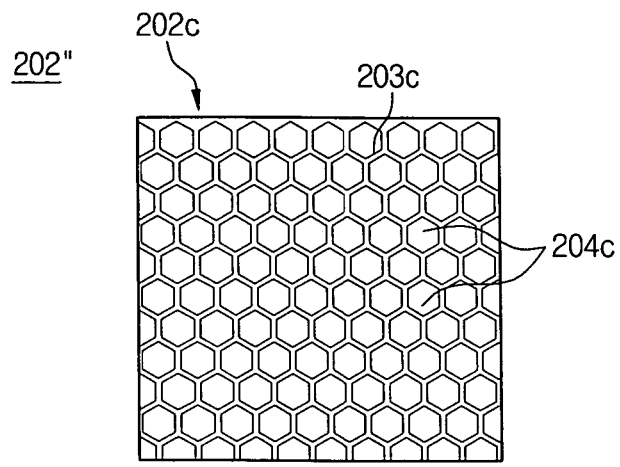

The catalytic unit 201 comprises an oxidative catalyst member 202, 202' or 202'' as shown in FIGS. 9A, 9B and 9C located within the exhaust duct 175 away from the heater 187 between the heater 187 and the outlet 175$b$ of the exhaust duct 175.

Alternatively, the oxidative catalyst member 202, 202' or 202'' may be integrally formed with the heater 187 rather than being spaced from the heater 187. In that event, the oxidative catalyst member 202, 202' or 202'' can have a center heater reception part in the form of a longitudinally extended opening (not shown) to receive and support the heater 187.

As shown in FIGS. 9A to 9C, the oxidative catalyst member 202, 202' or 202'' comprises a carrier 202$a$, 202$b$ or 202$c$ formed from one of gamma alumina and diatomaceous earth, and a catalyst layer 203$a$, 203$b$ or 203$c$ coated on the outer surface of the carrier and formed from a catalyst selected from a group consisting of Pd, Pt, $Co_3O_4$, PdO, $Cr_2O_3$, $Mn_2O_3$, CuO, $SeO_2$, $FeO_2$, $Fe_2O_3$, $V_2O_5$, NiO, Ag, $MoO_3$ and $TiO_2$. In other embodiments, the catalyst can be a mixture of these catalyst components.

The carrier 202$a$, 202$b$ or 202$c$ is formed by sintering powered gamma alumina or diatomaceous earth with a press. The carrier 202$a$, 202$b$ or 202$c$ preferably has a plurality of openings 204$a$, 204$b$ or 204$c$ formed in the air flow direction and shaped in the form of a grid shape as shown in FIG. 9B, a corrugated cardboard shape as shown in FIG. 9A, or a honeycomb shape in cross-section as shown in FIG. 9C, so that the area to be contacted with hydrocarbon gas can be increased.

The above-mentioned catalyst components have more intense oxidation activities for flammable hydrocarbon gases, for example methane ($CH_4$), in the order of $Pd>Pt>Co_3O_4>PdO>Cr_2O_3>Mn_2O_3>CuO>SeO_2>FeO_2>Fe_2O_3>V_2O_5>NiO>Ag>MoO_3>TiO_2$. However, Pd has a poor endurance against catalyst poison and $Co_3O_4$, $Mn_2O_3$ or the like is inferior in activity. Thus, it is more preferable to use Pt as the catalyst coated on the outer surface of the carrier because Pt is excellent in activity, heat resistance and catalyst-poison resistance.

The catalyst layer 203$a$, 203$b$ or 203$c$ generally promotes the oxidative decomposition of flammable hydrocarbons contained in the hot air discharged by the ventilation fan 184 along with heat generated from the heater 187. According to the present invention, however, because the hot air containing flammable hydrocarbon gas is supplied to the catalyst layer 203$a$, 203$b$, or 203$c$ along with ozone ($O_3$) generated in the ozone generator 191, the oxidative decomposition of the hydrocarbon contained in the hot air can be further promoted, as a result of which the rate of purifying hydrocarbon gas can be further enhanced.

Tests were performed in order to find the effect in increasing the rate of purifying a gas containing a flammable hydrocarbon gas by ozone ($O_3$) treatment. In the tests, the temperature of the heater 187 was 200° C., and the amount of flammable hydrocarbon gas prior to passing through the heater 187 and the oxidative catalyst members 202, 202' or 202" were 51 ppm. In the tests, the amount of flammable hydrocarbon gas after passing through the heater 187 and the oxidative catalyst member 202, 202' or 202" was investigated for one case in which ozone was not supplied at all, and for the other case in which ozone is supplied in the amount of 60 ppm. The results obtained through the tests are listed in Table 2 below. According to the tests, the rate of purifying the air by decomposing the flammable hydrocarbon gas is much improved by supplying ozone compared to the example where ozone was not supplied.

TABLE 2

| Condition of test | | Amount of hydrocarbon gas prior to passing heater & catalyst member | Amount of hydrocarbon gas after passing heater & catalyst member | Purifying rate |
|---|---|---|---|---|
| Temperature of heater | Amount of supplied ozone | | | |
| 200° C. | 0 ppm | 51 ppm | 9.5 ppm | 81.4% |
| 200° C. | 60 ppm | 51 ppm | 0 ppm | 100% |

As described above, the wet electrophotographic color printer 100, which has the gas purifying apparatus 150 according to the first embodiment of the present invention, is advantageous in that the rate of decomposing the flammable hydrocarbon gas generated at the time of fixing the toner image can be increased since the gas purifying apparatus 150 has an ozone generator 191 for generating ozone ($O_3$) that promotes the oxidative decomposition function of the oxidative catalyst member 202, 202' or 202" for the flammable hydrocarbon gas and in that the manufacturing costs can be saved by minimizing the reaction area of the catalyst layer 203a, 203b or 203c for oxidizing the hydrocarbon gas.

Furthermore, the wet electrophotographic color printer 100, which has the gas purifying apparatus 150 according to the first embodiment of the present invention, is advantageous in that the amount of ozone to be generated and supplied to the oxidative catalyst member 202, 202', 202" is varied depending on the amount of hydrocarbon gas generated at the time of fixing the toner image. Therefore, the hydrocarbon gas is oxidatively decomposed by the oxidative catalyst member is optimized, whereby the rate of purifying and decomposing flammable hydrocarbon gas can be increased and the power consumption and user's unpleasantness caused by excessive generation of ozone can be reduced.

Now, description is made in detail in terms of the method of purifying the gas of the wet electrophotographic color printer 100 having the gas purifying apparatus 150 according to the first embodiment of the present invention configured with reference to FIGS. 4 to 10.

At first, if the printer controller 111 applies a print or copying command to the engine controller 160 according to user's input through the operating panel 141 or a command from a computer, the engine controller 160 turns the developing unit (not shown), the image transfer unit (not shown) and the image fixation unit 110 of the printer mechanism and the ventilation fan 184 and the heater 187 ON and at the same time generates a print synchronizing signal PSYNC. As the engine controller 160 generates the print synchronizing signal PSYNC, the data buffer controller 125 and the counting unit 150 are reset and the clock generator 145 generates a print data demand clock. According to the print data demand clock from the clock generator 145, the data buffer controller 125 stores a print data inputted synchronously with the print data demand clock in the data memory 130, and then outputs the print data to the effective signal generation unit 135 and the data variable unit 127. As the data buffer controller outputs the print data, the data variable unit 127 outputs a video data VD to the engine controller 160 bit by bit according to a video clock VCLK and the print synchronizing signal PSYNC. The engine controller 160 scans laser beams corresponding to the vide data VD onto a photoconductor (not shown) through a laser diode of a laser scanning unit (not shown) and proceeds a series of image forming operations through the developing unit, the image transfer unit and the image fixation unit 110. (Step S1)

As a result, in order to fix a toner image transferred to a paper P through a series of image forming operations, the fixation and heating rollers 111, 112 of the fixation unit 110 compress the toner image against the paper P under a high temperature and high pressure. As a result, the hydrocarbon based carrier solution contained in the toner image is evaporated, thereby generating flammable hydrocarbon gas.

At this time, when a pixel of print data is inputted, the effective signal generation unit 135 generates a binary image data having a count effective signal with a value of '0' or '1' in one video clock, as shown in FIG. 7. Therefore, the counting unit 140 counts the number of count effective signals having a value of '0' or '1', i.e., the number of pixels, in the binary image data outputted from the effective signal generation unit 135 and outputs a count signal to the printer controller 111. After receiving the count signal, the printer controller 111 reads the coefficient K of toner consumption amount per unit stored in the coefficient memory 122. At the same time, the printer controller 111 calculates the actual toner consumption amount T for four colors of yellow, magenta, cyan and black in one page each time when the one page is printed while updating and storing the number of pixels of the print data corresponding to the count signal into the data memory 130. The print controller 111 then calculates the image coverage Cov of a toner image formed on the one page according to the calculated actual toner consumption amount T, determines one image pattern among the three image patterns exemplified in Table 1 according to the calculated image coverage Cov, and then outputs a corresponding ozone generation control signal to the engine controller 160. (Step 2)

According to the ozone generation control signal from the printer controller 111, the engine controller 160 outputs a corresponding PWM signal. The high voltage power source 190 applies a high voltage exceeding several KV corresponding to the ozone generation amount based on the determined image pattern to the electric-discharge electrode 194 and the induction electrode 195 according to the PWM signal from the engine controller 160. As a result, the dielectric substrate 196 forms oxygen plasma from the air existing in the pores 196a, and ionized oxygen atoms (O) formed by the oxygen plasma are joined with oxygen molecules ($O_2$), thereby forming ozone ($O_3$). (Step S3)

At this time, the heater 187 is maintained at a temperature in the range of 200-250° C. by the AC power controller 186 controlled by the engine controller 160, which outputs a control signal according to the temperature detection signal from the temperature detection sensor 188.

Thereafter, the hot air within the printer, which contains hydrocarbon gas generated from the carrier solution of the toner image by the fixation and heating rollers 111, 112, is drawn in by the ventilation fan 184 through the inlet 175a of exhaust duct 175 while being mixed with the ozone ($O_3$) generated in the ozone generator 191. (Step S4)

As expressed by Pyrolyzing Reaction Equation 1 below, the hydrocarbon gas contained in the air drawn into the exhaust duct 175 is heated to a temperature of 200-250° C. generated by the heater 187 while passing through the heater 187, whereby a very small amount of the hydrocarbon gas is pyrolyzed, and then the hydrocarbon gas is passed through the oxidative catalyst member 202, 202' or 202", thereby oxidatively decomposing the hydrocarbon gas. (Step S5)

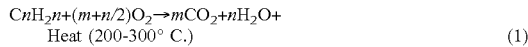

$$CnH_2n+(m+n/2)O_2 \rightarrow mCO_2+nH_2O+ \text{Heat} (200\text{-}300°\text{ C.}) \tag{1}$$

At this time, since the air passing through the heater 187 and the oxidative catalyst member 202, 202' or 202" contains ozone ($O_3$) generated from the ozone generator 191, the oxidation decomposition of the hydrocarbon gas contained in the air is further promoted.

Thereafter, the purified air containing oxidatively decomposed vapor and carbon dioxide is discharged out of the printer. (Step S6)

EXAMPLE 2

Figure 11:
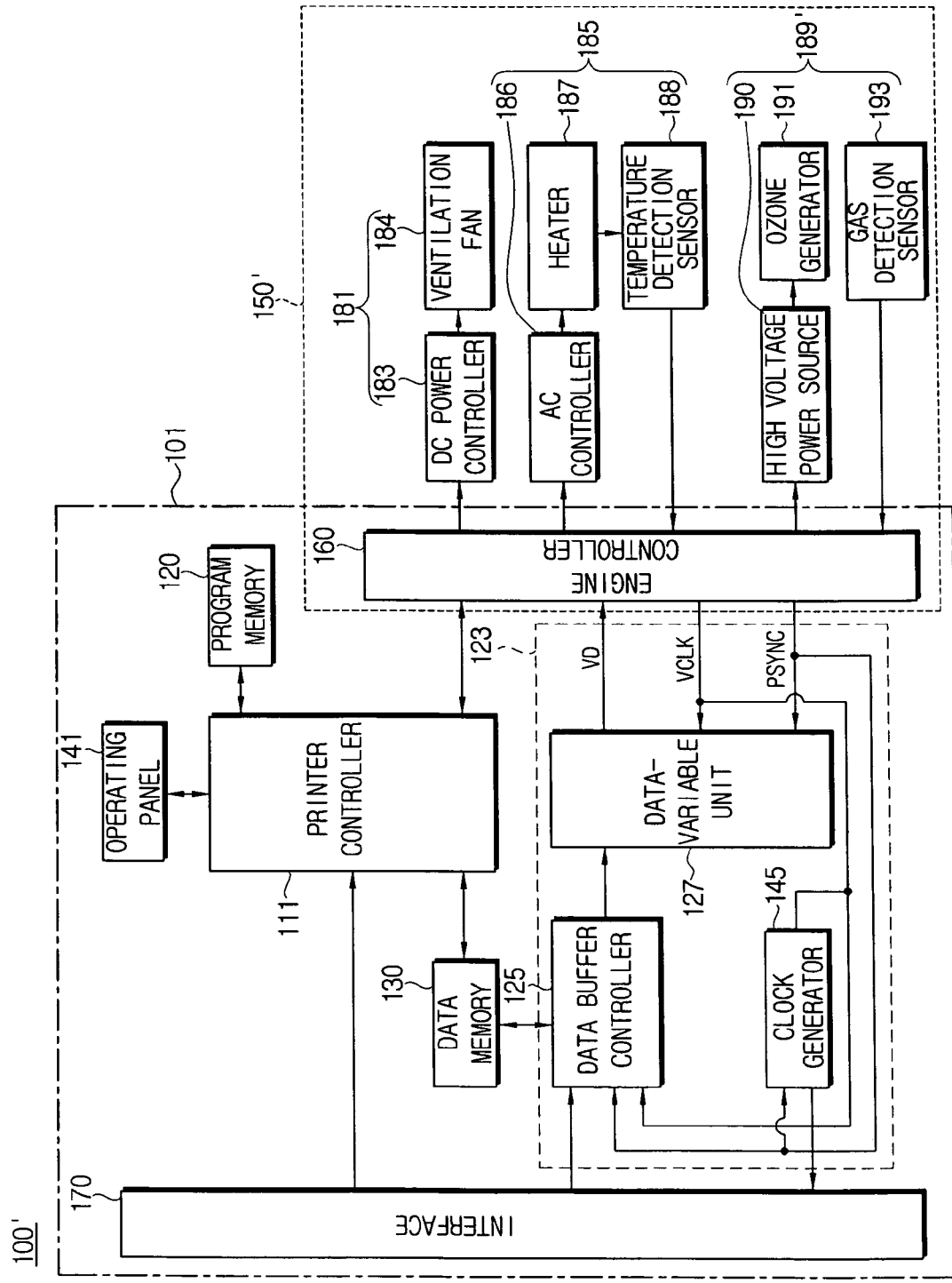
FIG. 11 is a schematic block diagram of a wet electrophotographic color printer with a gas purifying apparatus according to a second embodiment of the present invention.
Figure 12:
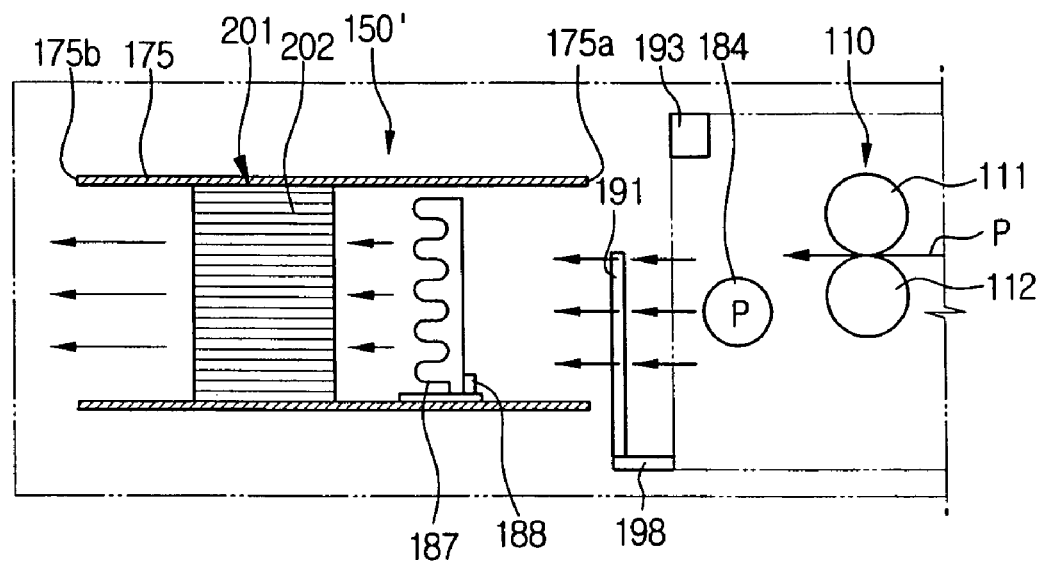
FIG. 12 is a schematic front elevational view of the gas purifying apparatus of the wet electrophotographic color printer shown in FIG. 11.

FIGS. 11 and 12 show an image forming apparatus 150' having a gas purifying apparatus 150' according to a second preferred embodiment of the present invention.

The image forming apparatus having the gas purifying apparatus 150' of the second embodiment of the present invention is a wet electrophotographic color printer 100', which internally processes data transmitted through an interface 170 from a computer (not shown) or the like as in the first embodiment.

As shown in FIG. 11, the wet electrophotographic color printer 100' comprises an interface 170 forming a connection part for interchanging data with a computer or the like, a program memory 120 for storing various control programs required for driving the printer 100, a data memory 130 for storing various data generated as the control programs are implemented and print data transmitted through the interface 170. A printer controller 111 is provided for implementing the control programs to control respective parts of the printer. An engine controller 160 controlled by the printer controller 111 is provided to drive the printer mechanism. A data controller 123 is provided for outputting the print data transmitted through the interface 170 to the engine controller 160. Referring to FIG. 12, a gas purifying apparatus 150' is provided for oxidatively decomposing and outwardly discharging impurities, such as flammable hydrocarbons contained in the gas produced when a toner image containing a carrier solution is fixed on a paper by a fixation unit 110.

Except the gas purifying apparatus 150', the interface 170, the program memory 120, the data memory 130, the printer controller 111, the engine controller 160, and the data controller 123 perform the same function and have the same construction with those of the printer 100 of the first embodiment described above with reference to FIG. 4.

The gas purifying apparatus 150' comprises an engine controller 160, a ventilation fan unit 184, an exhaust duct 175, an ozone generation unit 189', a heating unit 185 and a catalytic unit 201.

Except for the ozone generation unit 189', the engine controller 160, the ventilation unit 184, the exhaust duct 175, the heating unit 185 and the catalytic unit 201 are the same in construction as those of the gas purifying apparatus 150 of the printer 100 of the first embodiment.

The ozone generation unit 189' comprises an ozone generator 191, a gas detection sensor 193 and a high voltage power source 190. The ozone generator 191 is configured in an ozone generator which electrically forms plasma to generate ozone from the supplied air like the ozone generator of the printer 100 of the first embodiment.

The gas detection sensor 193 is located in the vicinity of the fixation and heating rollers 111, 112 of the fixation unit 110. The gas detection sensor 193 detects the amount of impurities, such as flammable hydrocarbon gases that are generated from hydrocarbon based carrier solution. The gas detection sensor 193 measures the air passing through the printer and detects the impurities released from the toner image within a predetermined period when the toner image is fixed on a paper P by fixing heat at the high temperature of the fixation and heating rollers 111, 112 of the fixation unit 110. The gas detection sensor 193 then outputs a gas detection signal to the engine controller 160 corresponding to the amount of impurities in the air released from the toner. It is preferable to employ a commercially available hydrocarbon detection sensor for detecting the amount of hydrocarbon based gas.

The engine controller 160 classifies the amount of hydrocarbon gas within the printer into one of a plurality of preset ranges. For example, the three ranges of a gas detection signal from the gas detection sensor 193 are exemplified in Table 3 below. The gas detection sensor 193 outputs a corresponding PWM signal to the high voltage power source 190, so that the amount of ozone generation by the ozone generator 191 is adjusted to one of a plurality of preset values of the amount of ozone generation. For example three values of the amount of ozone generated are exemplified in Table 3.

TABLE 3

| Amount of hydrocarbon gas | Ozone generation amount |
|---|---|
| Low (the range of the amount of hydrocarbon gas when image coverage of embodiment 1 is 10-20%) | About 10 ppm |
| Middle (the range of the amount of hydrocarbon gas when image coverage of embodiment 1 is 20-60%) | About 20 ppm |
| High (the range of the amount of hydrocarbon gas when image coverage of embodiment 1 exceeds 60%) | About 60 ppm |

The high voltage power source 190 is configured by a PWM inverter and applies a high voltage exceeding several KV to the ozone generator 191 so that the ozone generator 191 generates an amount of ozone corresponding to the PWM signal from the engine controller 160.

Figure 13:
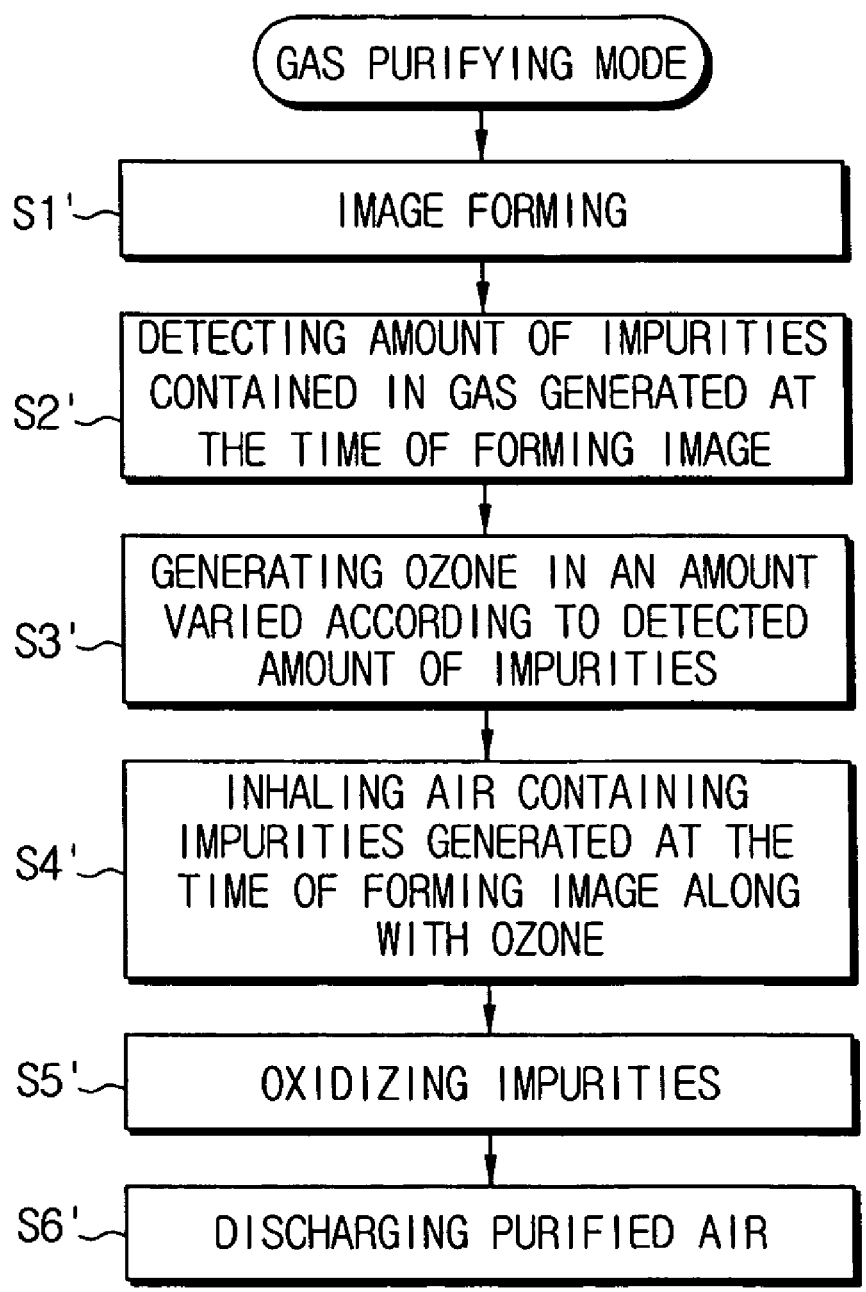
FIG. 13 is a flowchart exemplifying a process of a gas purifying method by the gas purifying device of the wet electrophotographic color printer shown in FIG. 11.

The following is a description of the method of purifying gas of the wet electrophotographic color printer 100' having the gas purifying apparatus 150' according to the second embodiment of the present invention with reference to FIGS. 11 through 13.

At first, if the printer controller 111 applies a print or copying command to the engine controller 160 according to user's input through the operating panel 141 or a command from a computer, the engine controller 160 turns on the developing unit (not shown), the image transfer unit (not shown) and the image fixation unit 110 of the printer mechanism and the ventilation fan 184 and the heater 187 while at the same time generating a print synchronizing signal PSYNC. These steps are substantially the same as in the printer 100 of the first embodiment. As the engine controller 160 generates the print synchronizing signal PSYNC, the data buffer controller 125 is reset and the clock generator 145 generates a print data demand clock. According to the print data demand clock from the clock generator 145, the data buffer controller 125 stores a print data inputted synchronously with the print data demand clock in the data memory 130, and then outputs the print data to the data variable unit 127. As the data buffer controller 125 outputs the print data, the data variable unit 127 outputs a video data VD to the engine controller 160 bit by bit according to a video clock VCLK and the print synchronizing signal PSYNC. The engine controller 160 scans laser beams corresponding to the video data VD onto a photoconductor (not shown) through a laser diode of a laser scanning unit (not shown) and proceeds a series of image forming operations through the developing unit, the image transfer unit and the image fixation unit 110. (Step S1')

As a result, in order to fix a toner image that is transferred to a paper P through a series of image forming operations, the fixation and heating rollers 111, 112 of the fixation unit 110 compress the toner image against the paper P under a high temperature and high pressure. During the heating of the hydrocarbon based carrier solution contained in the toner image, the hydrocarbon component is evaporated, thereby generating a flammable hydrocarbon gas.

At this time, the heater 187 is maintained at a temperature in the range of 200-250° C. by the AC power controller 186 controlled by the engine controller 160, which outputs a control signal according to a temperature detection signal from the temperature detection sensor 188.

The gas detection sensor 193 located in the vicinity of the fixation and heating rollers 111, 112 of the fixation unit 110 detects the amount of impurities such as flammable hydrocarbon gas in a predetermined period and outputs a gas detection signal to the engine controller 160. (Step S2')

The engine controller 160 classifies the amount of hydrocarbon gas within the printer 100' into one of three ranges exemplified in Table 3 according to the gas detection signal from the gas detection sensor 193. The engine controller 160 then outputs a corresponding PWM signal to the high voltage power source 190, so that the amount of ozone generated by the ozone generator 191 is adjusted to one of the three values of ozone generation amount exemplified in Table 3. According to the PWM signal from the engine controller 160, the high voltage power source 190 applies a high voltage exceeding several KV, which corresponds to an ozone generation amount according to an amount of hydrocarbon gas, to the electric-discharge electrode 194 and the induction electrode 195 of the ozone generator 191. As a result, the dielectric substrate 196 forms oxygen plasma from the air existing in the pores 196a, and ionized oxygen atoms (O)formed by the oxygen plasma are joined with oxygen molecules ($O_2$), thereby forming ozone ($O_3$). (Step S3').

Thereafter, the hot air within the printer, which contains the hydrocarbon gas generated from a carrier solution of the toner image by the fixation and heating rollers 111, 112 is drawn through the inlet 175a of exhaust duct 175 while being mixed with the ozone ($O_3$) generated in the ozone generator 191 by the ventilation fan 184. (Step S4').

As expressed by Pyrolyzing Reaction Equation 1 above, the hydrocarbon gas contained in the air drawn into the exhaust duct 175 is heated by the heat of 200-250° C. generated from the heater 187 while passing through the heater 187, whereby a very small amount of the hydrocarbon gas is pyrolyzed, and then the hydrocarbon gas is flown into the oxidative catalyst member 202, 202' or 202", thereby being oxidatively decomposed. (Step S5').

At this time, the air passes through the heater 187 and oxidative catalyst member 202, 202' or 202" containing ozone ($O_3$) generated from the ozone generator 191 to promote the oxidative decomposition of hydrocarbon gas contained in air.

Thereafter, the purified air containing oxidatively decomposed vapor and carbon dioxide are discharged out of the printer (Step S6').

As described above in connection with the gas purifying apparatus, the wet electrophotographic color printer having the gas purifying apparatus and the method of purifying gas from the printer according to the present invention, the rate of purifying flammable hydrocarbon gas generated at the time of fixing the toner image can be increased. The gas purifying apparatus of the invention has an ozone generator for generating ozone that promotes the oxidative decomposition reaction by the oxidative catalyst member to decompose the flammable hydrocarbon gas. The manufacturing costs of the air purification device are reduced by minimizing the reactive area of the catalyst for oxidizing the hydrocarbon gas.

Furthermore, with the gas purifying apparatus, the wet electrophotographic color printer having the gas purifying apparatus and the method of purifying gas of the printer according to the present invention, control and vary the amount of ozone generated and supplied to the oxidative catalyst member depending on the amount of hydrocarbon gas generated at the time of fixing the toner image and detected by the sensor. The hydrocarbon gas is oxidatively decomposed by the oxidative catalyst member under an optimum circumstance, whereby the rate of purifying flammable hydrocarbon gas is increased and the power consumption and the offensive odors caused by excessive generation of ozone are reduced.

While the preferred embodiments of the present invention have been shown and described in order to exemplify the principle of the present invention, the present invention is not limited to the specific embodiments. It will be understood that various modifications and changes can be made by one skilled in the art without departing from the spirit and scope of the invention as defined by the appended claims. Therefore, it shall be considered that such modifications, changes and equivalents thereof are all included within the scope of the present invention.

What is claimed is:

1. A gas purifying apparatus for an image forming apparatus, comprising:
   a fan unit for ventilating air;
   a heating unit downstream of the fan unit for heating the air ventilated by the fan unit;
   a catalytic unit for facilitating the oxidative decomposition of impurities contained in the air, the catalytic unit being downstream of the heating unit; and an ozone generation unit for generating ozone, the ozone generation unit being located upstream of the heating unit and the catalytic unit in a direction of flow of the air and downstream of the fan unit.

2. The gas purifying apparatus as claimed in claim 1, wherein the ozone generation unit comprises an ozone generator for generating ozone by a plasma process, a corona discharge process, an electrolysis process, a photochemical process, or a radiation process.

3. The gas purifying apparatus as claimed in claim 2, wherein the heating unit comprises a heater for electrically generating heat.

4. The gas purifying apparatus as claimed in claim 3, wherein the catalytic unit comprises a carrier containing gamma alumina or diatomaceous earth, and a catalyst coated on the outer surface of the carrier and formed from one component selected from the group consisting of Pd, Pt, $Co_3O_4$, PdO, $Cr_2O_3$, $Mn_2O_3$, CuO, $SeO_2$, $FeO_2$, $Fe_2O_3$, $V_2O_5$, NiO, Ag, $MoO_3$ and $TiO_2$.

5. The gas purifying apparatus as claimed in claim 4, wherein the carrier has a plurality of openings formed in the direction of flow of the air and is shaped to have a cross-sectional shape selected from a grid shape, a corrugated cardboard shape and a honeycomb shape, to provide a contact surface sufficient to decompose the impurities in the air passing through the catalytic unit.

6. The gas purifying apparatus as claimed in claim 1, further comprising:
an image pattern determination unit for determining an image pattern formed by an image forming apparatus; and
an engine controller for controlling an amount of ozone generated by the ozone generation unit, according to the image pattern determined by the image pattern determination unit.

7. The gas purifying apparatus as claimed in claim 6, wherein the image pattern determination unit calculates an image coverage (Cov) according to an actual toner consumption amount (T) consumed at a time the image forming apparatus forms an image, and determines an image pattern among a plurality of preset image patterns according to the calculated image coverage (Cov), and
wherein the engine controller controls the ozone generation unit, to generate ozone in an amount corresponding to one of a plurality of preset values of an amount of ozone generated according to the selected image pattern.

8. The gas purifying apparatus as claimed in claim 7, wherein the plurality of preset image patterns include a text pattern, a graphic pattern and a photo pattern, and wherein the plurality of preset values of an amount of ozone generated are about 10 ppm, about 20 ppm, and about 60 ppm, respectively.

9. The gas purifying apparatus as claimed in claim 1, further comprising:
a gas detection sensor for detecting the amount of said impurities contained in the air; and
an engine controller for variably controlling an amount of ozone generated according to the amount of impurities detected by the gas detection sensor.

10. The gas purifying apparatus as claimed in claim 9, wherein the gas detection sensor comprises a hydrocarbon detection sensor, and
wherein the engine controller controls the ozone generation unit, to generate ozone in an amount corresponding to one of a plurality of preset values of an amount of ozone generation according to the amount of impurities detected by the hydrocarbon detection sensor.

11. The gas purifying apparatus as claimed in claim 7, wherein the plurality of preset values of ozone generation amount include about 10 ppm, about 20 ppm, and about 60 ppm.

12. An image forming apparatus comprising:
a fixation unit for fixing a toner image onto a paper with heat and pressure; and
a gas purifying unit for purifying and discharging impurities contained in gas generated by said fixing of the toner image, wherein the gas purifying unit is positioned downstream of the fixation unit and comprises:
an exhaust duct forming an air discharge passage from an interior to an exterior of the image forming apparatus,
a ventilation fan unit for ventilating and discharging the air from the fixation unit through the exhaust duct,
a heating unit for heating the air discharged through the exhaust duct,
a catalytic unit for facilitating an oxidative decomposition of impurities contained in the air, and
an ozone generation unit for generating ozone, the ozone generation unit being located upstream of the heating unit and the catalytic unit in a direction of air flow.

13. The image forming apparatus as claimed in claim 12, wherein the ozone generation unit comprises an ozone generator for generating ozone by a plasma process, corona discharge process, an electrolysis process, a photochemical process or a radiation process.

14. The image forming apparatus as claimed in claim 13, wherein the heating unit comprises a heater for electrically generating heat.

15. The image forming apparatus as claimed in claim 14, wherein the catalytic unit comprises a carrier containing gamma alumina or diatomaceous earth, and a catalyst coated on the outer surface of the carrier, said catalyst being a component selected from a group consisting of Pd, Pt, $Co_3O_4$, PdO, $Cr_2O_3$, $Mn_2O_3$, CuO, $SeO_2$, $FeO_2$, $Fe_2O_3$, $V_2O_5$, NiO, Ag, $MoO_3$ and $TiO_2$.

16. The image forming apparatus as claimed in claim 15, wherein the carrier has a plurality of openings formed in the air flow direction and having a cross-sectional shape selected from the group consisting of a grid shape, a corrugated cardboard shape and a honeycomb shape, to provide a contact surface sufficient to decompose the impurities in the air passing through the catalytic unit.

17. The image forming apparatus as claimed in claim 12, wherein the gas purifying unit further comprises:
an image pattern determination unit for determining an image pattern formed by the image forming apparatus; and
an engine controller for controlling an amount of ozone generated by the ozone generation unit, according to the image pattern determined by the image pattern determination unit.

18. The image forming apparatus as claimed in claim 17, wherein the image pattern determination unit calculates an image coverage (Cov) according to an actual toner consumption amount (T) consumed at a time the image forming apparatus forms an image, and determines an image pattern among a plurality of preset image patterns according to the calculated image coverage (Cov), and
wherein the engine controller controls the ozone generation unit, to generate ozone in an amount corresponding to one of a plurality of preset values of an amount of ozone generated according to the determined image pattern.

19. The image forming apparatus as claimed in claim 18, wherein the plurality of preset image patterns include a text pattern, a graphic pattern and a photo pattern, and wherein the plurality of preset values of an amount of ozone generated or about 10 ppm, about 20 ppm, and about 60 ppm.

20. The image forming apparatus as claimed in claim 12, the gas purifying unit further comprises:
   a gas detection sensor for detecting the amount of impurities contained in the air; and
   an engine controller for controlling and varying an amount of ozone generated by the ozone generation unit, according to an amount of impurities detected by the gas detection sensor.

21. The image forming apparatus as claimed in claim 20, wherein the gas detection sensor comprises a hydrocarbon detection sensor, and
   wherein the engine controller controls the ozone generation unit, to generate ozone in an amount corresponding to one of a plurality of preset values of an amount of ozone generation according to the amount of impurities detected by the hydrocarbon detection sensor.

22. The image forming apparatus as claimed in claim 21, wherein the plurality of preset amounts of ozone generated are about 10 ppm, about 20 ppm, and about 60 ppm.

23. A method of purifying gas of an image forming apparatus having a fixation unit, the method comprising steps of:
   forming an image and fixing the image by the fixation unit in the image forming apparatus;
   generating ozone in the exhaust gas stream downstream of the fixation unit; and
   oxidatively decomposing impurities contained in gas stream generated by the forming of the image with the ozone.

24. The method as claimed in claim 23, wherein said image is formed by an electrophotographic printer from a toner containing a volatile organic component that is released by forming the image.

25. The method as claimed in claim 23, wherein said image is formed by transferring a toner image to a substrate and heating the toner image to fix the toner onto the substrate.

26. The method as claimed in claim 23, wherein the ozone generating step comprises variably generating ozone according to a pattern of the image formed by the image forming step.

27. The method as claimed in claim 26, wherein the step of variably generating ozone according to the image pattern comprises:
   calculating an image coverage (Cov) according to an actual toner consumption amount (T) consumed at a time of forming the image and determining an image pattern selected from a plurality of preset image patterns according to the calculated image coverage (Cov), and
   generating ozone in an amount corresponding to one of a plurality of preset values of an amount of ozone generated according to the selected image pattern.

28. The method as claimed in claim 27, wherein the plurality of preset image patterns include a text pattern, a graphic pattern and a photo pattern, and the plurality of preset values of an amount of ozone generated are about 10 ppm, about 20 ppm, and about 60 ppm, respectively.

29. The method as claimed gas purifying apparatus as claimed in claim 23, further comprising step of:
   generating ozone in an amount according to an amount of impurities contained in a gas generated by the image forming step.

30. The method as claimed in claim 29, wherein the method further comprises:
   detecting the amount of impurities in the gas generated by the image forming step;
   generating ozone in an amount corresponding to one of a plurality of preset values of an amount of ozone generated according to the amount of detected impurities, the ozone being generated in an amount to decompose the impurities in air from the imaging forming apparatus.

31. The method as claimed in claim 30, wherein the plurality of preset values of the amount of ozone generated are about 10 ppm, about 20 ppm, and about 60 ppm.

* * * * *